W. H. LOTZ

Assignor, by mesne assignments, to F. FISCHBECK.

Extension Sofa-Bed.

No. 9,215. Reissued May 25, 1880.

Witnesses:
Geo. Frommann
Emil H. Frommann

Inventor:
William H. Lotz

N. PETERS, PHOTO-LITHOGRAPHER, WASHINGTON, D. C.

UNITED STATES PATENT OFFICE.

WILLIAM H. LOTZ, OF CHICAGO, ILLINOIS, ASSIGNOR, BY MESNE ASSIGNMENTS, TO FREDERICK FISCHBECK.

EXTENSION SOFA-BED.

SPECIFICATION forming part of Reissued Letters Patent No. 9,215, dated May 25, 1880.

Original No. 85,391, dated December 29, 1868. Application for reissue filed November 25, 1879.

*To all whom it may concern:*

Be it known that I, WILLIAM H. LOTZ, of Chicago, in the county of Cook and State of Illinois, have invented certain new and useful Improvements in Extension Sofa-Beds; and I do hereby declare that the following is a full, clear, and exact description thereof, reference being had to the accompanying drawings, making part of this specification, and to the letters of reference marked thereon, like letters indicating like parts wherever they occur.

The object I have in view is to produce a sofa-bed which will not require a mattress, and when extended will present a continuous upholstered surface, with an upholstered head-rest extending entirely across the same, and that without reversing the extension-frame or the cushion of either the extension or stationary frame, and without reversing the bolster or head-rest of either frame.

To enable others skilled in the art to construct and use my invention, I will proceed to describe the same with reference to the drawings, in which—

Figure 1:
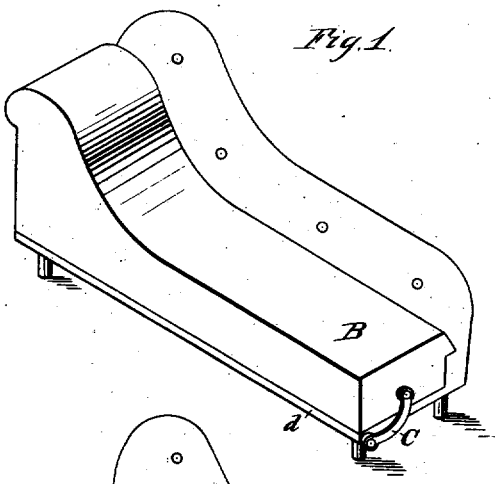
Figure 3:
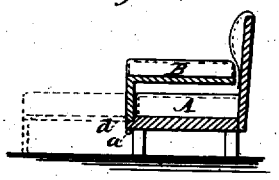
Figure 2:
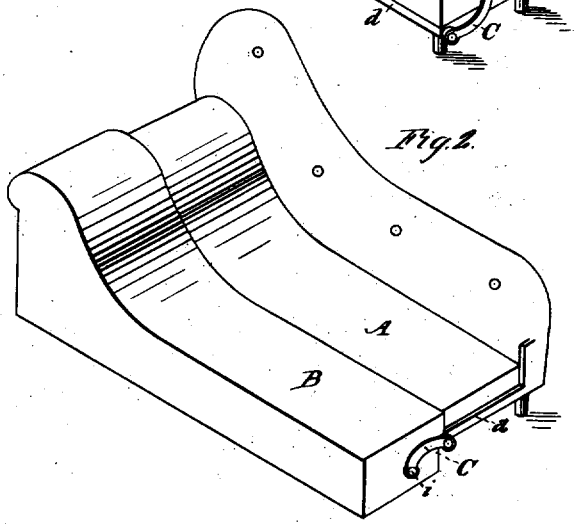

Figure 1 is a perspective view of the sofa closed; Fig. 2, the same opened or extended as a double bed; Fig. 3, a cross-section of the device closed, with the upholstering more clearly shown, the position of the parts when extended being indicated by dotted lines; and Fig. 4, an end elevation of the head of the device when extended.

My sofa-bed is constructed of an ordinary upholstered sofa, having connected to it, by pivoted arms, an extension body or shell upholstered only on its upper side, the interior shape and size of which correspond with the exterior of the sofa-body, and which shell, when the device is closed, is set upon or over the body of the sofa, covering the top, front, and ends thereof, and giving the sofa the same appearance that it had before the shell was placed upon it, with the exception of being increased in size an amount equal to the thickness of the shell. When the sofa is to be extended the shell is lifted off and placed on the floor in front of and against the sofa, it being held in place against the sofa by the pivoted arms or links before referred to.

A represents the sofa; B, the shell, which is connected to the sofa by the links or arms C, one at each end, each of said arms being connected at one end rigidly to the shaft or rod *a*, lying underneath and running lengthwise of the sofa, and at their opposite ends, by pivots *i*, to the ends of the shell C, all as clearly shown in Figs. 1, 2, and 4.

Figure 4:
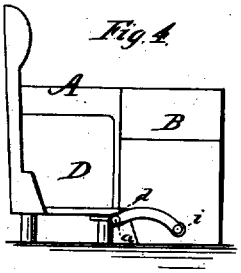

The arms C are of such length and the pivots *i* so located that when the shell is on the sofa they allow it to rest snugly in place, with its rear edge close against the back of the sofa and its lower edges resting upon the ledge *d*, as shown in Figs. 1, 3, and 4, thus giving it a good solid support, and preventing it from sliding or working off of the sofa, and, when swung down in front, to hold it (the shell) firmly up against the sofa, with its rear edge resting upon the ledge *d*, as shown in Figs. 2 and 4.

That portion of the body of the sofa underneath the elevated end or bolster is made hollow and left open at the end, forming a recess or chamber, D, into which the bed-clothes may be placed, the chamber being closed by the end of the shell, which shuts down over the open end, thus affording a spacious and convenient receptacle to contain all the loose articles used, wearing-apparel as well as bed-clothes.

The elevated head-rests or bolsters of both the sofa and extension-section are made continuous with the bodies of those parts.

The sofa is upholstered, as usual, on its upper surface, Fig. 3, which upholstering is not interfered with by the movement of the extension-section. The extension-section or shell is upholstered only on its upper side, Fig. 3, and always presents its upholstered surface upward. When the sofa is extended to form a bed the upholstered surfaces of the sofa and shell are brought upon a level and present one continuous upholstered surface, not requiring a mattress to complete the bed.

The upholstering of the whole is such as to effectually conceal all joints, &c., when the sofa is closed, so that no indication is presented to the closest observer of the device being more than a common sofa, with the exception of the arms C, which may, however, be so formed as to be more ornamental than otherwise, or they may be so attached as to close inside of the shell and out of sight, thus affording no clue whatever to the double purpose of the contrivance.

As the arms C are both rigidly secured to the shaft *a*, one end of the shell B cannot be moved without operating the other in a similar manner, so that by taking hold of one end of the shell the whole may be carried over into the required position.

The shell or extension-section B may be made of any required thickness and of any suitable materials.

When desired, the shell may be detached by simply removing the pivots *i*, thus affording two distinct and separate sofas.

Having thus fully described my invention, what I claim is—

1. A sofa-bed, substantially as before set forth, composed of an upholstered stationary section with an upholstered elevated head-rest, and an upholstered extension-section with similar elevated head-rest attached to and moving with it, which sections, when shut on each other, form a lounge, and when drawn out form a double upholstered bed, with an upholstered elevated head-rest extending entirely across it.

2. A sofa-bed, substantially as before set forth, composed of a stationary section with an elevated head-rest, and an extension-section with a similar elevated head-rest attached to and moving with it, which sections, when shut on each other, form a lounge, and when drawn out form a double upholstered bed, with an elevated upholstered head-rest extending entirely across it, both of such sections and said head-rests being upholstered on their upper sides, and the extension-section being adapted to move laterally off of the stationary section, so as to always present its upholstered side and head-rest upward without turning the cushion or head-rest.

3. A sofa-bed consisting of an upholstered sofa, A, and an upholstered shell, B, of corresponding form, both having elevated head-rests, and always presenting, whether closed or extended, their upholstered sides and elevated head-rests upward, substantially as described and shown.

4. A sofa-bed consisting of the sofa A and the shell B, united by means of the shaft *a*, with the arms C attached rigidly thereto, and pivoted at their opposite ends to the shell B, all constructed and arranged to operate substantially as herein set forth.

WILLIAM H. LOTZ.

Witnesses:
R. N. DYER,
E. JEBSEN.